(12) United States Patent
Bian et al.

(10) Patent No.: US 12,153,570 B2
(45) Date of Patent: Nov. 26, 2024

(54) DATABASE TRANSACTION PROCESSING METHOD AND APPARATUS, SERVER, AND STORAGE MEDIUM

(71) Applicant: Tencent Technology (Shenzhen) Company Limited, Shenzhen (CN)

(72) Inventors: Haoqiong Bian, Shenzhen (CN); Sheng Ye, Shenzhen (CN); Hailin Lei, Shenzhen (CN); Kang Sun, Shenzhen (CN); Haixiang Li, Shenzhen (CN); Anqun Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 86 days.

(21) Appl. No.: 17/743,293

(22) Filed: May 12, 2022

(65) Prior Publication Data
US 2022/0276998 A1   Sep. 1, 2022

Related U.S. Application Data

(63) Continuation of application No. PCT/CN2021/096691, filed on May 28, 2021.

(30) Foreign Application Priority Data

Jun. 10, 2020   (CN) .......................... 202010520559.2

(51) Int. Cl.
*G06F 16/23* (2019.01)
*G06F 16/21* (2019.01)
*G06F 16/27* (2019.01)

(52) U.S. Cl.
CPC ........ *G06F 16/2379* (2019.01); *G06F 16/219* (2019.01); *G06F 16/27* (2019.01)

(58) Field of Classification Search
CPC ..... G06F 16/2379; G06F 16/219; G06F 16/27
See application file for complete search history.

(56) References Cited

U.S. PATENT DOCUMENTS 6,892,205 B1* 5/2005 Colrain ............ G06F 16/24552
8,661,068 B1   2/2014 Seibel et al.
(Continued)

FOREIGN PATENT DOCUMENTS

CN    1794207 A    6/2006
CN  102016852 A    4/2011
(Continued)

OTHER PUBLICATIONS

Tencent Technology, Extended European Search Report and Supplementary Search Report, EP21822853.4, Jan. 2, 2023, 18 pgs.
(Continued)

*Primary Examiner* — Kuen S Lu
(74) *Attorney, Agent, or Firm* — Morgan, Lewis & Bockius LLP

(57) ABSTRACT

This application discloses a database transaction processing method performed by a computer device. The method includes: in a case of starting a target transaction, obtaining, by a working node in a distributed database system, a transaction timestamp of the target transaction and current global latest version information, the target transaction including at least one operation statement for a target data object, and the global latest version information being version information of latest generated metadata of metadata stored in the distributed database system; determining latest-version metadata of the target data object according to the current global latest version information, and determining to-be-accessed user data of the target transaction according to the transaction timestamp; and executing an operation statement of the target transaction on the to-be-accessed user (Continued)

data based on the latest-version metadata of the target data object.

20 Claims, 9 Drawing Sheets

(56) References Cited

U.S. PATENT DOCUMENTS

| | | | | |
|---|---|---|---|---|
| 8,745,445 | B1* | 6/2014 | Choi | G06F 11/2056 714/15 |
| 9,811,560 | B2 | 11/2017 | Di Blas et al. | |
| 2012/0331019 | A1 | 12/2012 | Schreter | |
| 2014/0067884 | A1 | 3/2014 | Tata | |
| 2018/0060373 | A1* | 3/2018 | Foebel | G06F 16/275 |
| 2018/0322156 | A1* | 11/2018 | Lee | G06F 16/23 |

FOREIGN PATENT DOCUMENTS

| | | |
|---|---|---|
| CN | 106021381 A | 10/2016 |
| CN | 108829713 A | 11/2018 |
| CN | 110018845 A | 7/2019 |
| CN | 110019530 A | 7/2019 |
| CN | 110196760 A | 9/2019 |
| CN | 110245149 A | 9/2019 |
| CN | 111427966 A | 7/2020 |
| EP | 3401806 A1 | 11/2018 |
| JP | H 0258165 A | 2/1990 |
| JP | H 0391076 A | 4/1991 |
| KR | 20000038101 A | 7/2000 |

OTHER PUBLICATIONS

Tencent Technology, ISR, PCT/CN2021/096691, Aug. 25, 2021, 2 pgs.
Tencent Technology, WO, PCT/CN2021/096691, Aug. 25, 2021, 5 pgs.
Tencent Technology, IPRP, PCT/CN2021/096691, Dec. 13, 2022, 6 pgs.
Tencent Technology, Singaporean Written Opinion, SG Patent Application No. 11202203800V, Oct. 10, 2024, 6 pgs.

* cited by examiner

DATABASE TRANSACTION PROCESSING METHOD AND APPARATUS, SERVER, AND STORAGE MEDIUM

CROSS-REFERENCE TO RELATED APPLICATIONS

This application is a continuation application of PCT Patent Application No. PCT/CN2021/096691, entitled "DATABASE TRANSACTION PROCESSING METHOD AND APPARATUS, AND SERVER AND STORAGE MEDIUM" filed on May 28, 2021, which claims priority to Chinese Patent Application No. 202010520559.2, filed with the State Intellectual Property Office of the People's Republic of China on Jun. 10, 2020, and entitled "DATABASE TRANSACTION PROCESSING METHOD AND APPARATUS, SERVER, AND STORAGE MEDIUM", all of which are incorporated herein by reference in their entirety.

FIELD OF THE TECHNOLOGY

This application relates to the field of database technologies, and more specifically, to a database transaction processing method and apparatus, a server, and a storage medium.

BACKGROUND OF THE DISCLOSURE

Metadata is data used to describe data. For example, data used to describe the organization and the structure of a data object in a database may be considered as a type of metadata. A distributed database system includes a global metadata storage and a plurality of working nodes. The global metadata storage maintains global metadata information and includes all metadata in the system. A local cache of each working node stores a part or all of global metadata information.

Before executing a transaction or an operation statement for a data object, a working node usually needs to perform some processing operations based on metadata of the data object. The working node first obtains the metadata from a local cache. When failing in obtaining the metadata, the working node obtains the metadata from the global metadata storage. Therefore, it is very important to ensure consistency between metadata cached by working nodes.

SUMMARY

Embodiments of this application provide a database transaction processing method, applied to a working node in a distributed database system. The method includes: in a case of starting a target transaction, obtaining a transaction timestamp of the target transaction and current global latest version information of the distributed database system, the target transaction including at least one operation statement for a target data object, and the global latest version information being version information of latest generated metadata of metadata stored in the distributed database system; determining latest-version metadata of the target data object according to the current global latest version information, and determining to-be-accessed user data of the target transaction according to the transaction timestamp; and executing an operation statement of the target transaction on the to-be-accessed user data based on the latest-version metadata of the target data object.

According to another aspect, the embodiments of this application provide a computer device (e.g., server) acting as a working node in a distributed database system, including: one or more processors; a memory; and one or more programs, the one or more programs being stored in the memory and, when executed by the one or more processors, causing the computer device to perform the foregoing method.

According to another aspect, the embodiments of this application provide a non-transitory computer-readable storage medium, storing one or more programs, the one or more programs being capable of, when executed by a processor of a computer device acting as a working node in a distributed database system, causing the computer device to perform the foregoing method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

To make a person in the art understand the solutions in this application better, the following clearly and completely describes the technical solutions in the embodiments of this application with reference to the accompanying drawings in the embodiments of this application.

Figure 1:
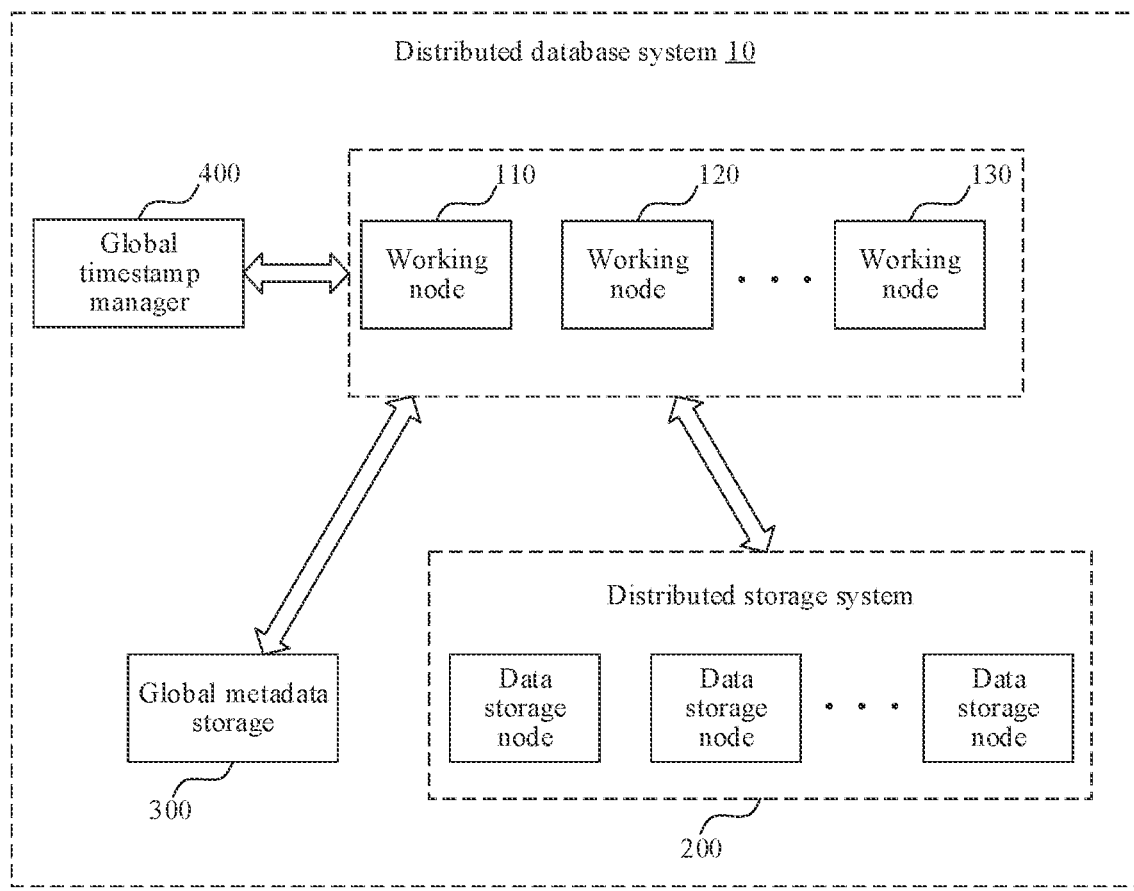
FIG. 1 is a schematic architectural diagram of a distributed database system according to an embodiment of this application.

FIG. 1 is a schematic architectural diagram of a distributed database system 10 according to an embodiment of this application. The distributed database system 10 includes: a distributed storage system 200, a global metadata storage 300, a global timestamp manager (GTM) 400, and at least two working nodes, for example, working nodes 110, 120, and 130 shown in FIG. 1.

The distributed storage system 200 may include a plurality of physical storage nodes (for example, a storage server and a host) and is configured to store user data. The distributed storage system 200 may further include a plurality of data storage (DS) nodes. Each DS node corresponds to some storage resources of a storage resource pool formed by the plurality of physical storage nodes, and is configured to manage user data stored by the storage resources.

The working node may also be referred to as a computation node (CN) and is configured to receive and execute a transaction request committed by a database user and a process of an operation statement of a transaction. The database user herein may be understood as a database object in the distributed database system, may also be referred to as a user object, and may be considered as a bridge connecting user login information to user data.

In the embodiments of this application, if the distributed database system 10 uses an architecture in which storage and computation are separated from each other, the working node and the DS node usually belong to different processes. If the distributed database system 10 does not use an architecture in which storage and computation are separated from each other, the working node and the DS node are only logical modules and may actually belong to the same process.

The working node and the DS node may run on a physical storage node in the distributed storage system 200, or may run on another physical server outside the distributed storage system 200. This is not limited in the embodiments of this application.

The global metadata storage stores all metadata in the distributed database system 10, and each piece of metadata may have at least two versions. Each working node has a local cache, for example, the working node 110 has a local cache 111, the working node 120 has a local cache 121, and the working node 130 has a local cache 131. "Local" herein may be understood as belonging to a physical device of a working node. Correspondingly, a local cache of a working node may be a storage space on a physical server of the working node, and the storage space may be used by the working node to cache a part or all of global metadata information of the distributed database system 10. In the embodiments of this application, the global metadata storage may be, for example, a global data dictionary (GDD), and the local cache of the working node may be a data dictionary cache (DDC).

In the database system, a common type of metadata is schema information. The schema information is description information of logical structures and features of the entire data in the database system, and may be understood as a view of logical data of database users. In the database system, each data object may have a corresponding schema object. The schema object herein may be understood as a set formed by combining schema information of the data object according to a particular data structure.

The data object is data stored in the database system. As types of database systems are different, data objects are also different. For example, data tables are basic storage objects in some database systems. In this case, data objects in these database systems may be understood as data tables. In another example, documents are basic storage objects in some database systems. In this case, data objects in these database systems may be understood as documents. A schema object of a data table is used as an example. The schema object usually includes definition information of the data table, for example, a table name, a table type, an attribute name in the table, an attribute type, an index, and data constraint.

For example, metadata is schema information. In the distributed database system 10, the working node usually needs to first access a schema object of a data object before performing any data query and data operation on the data object, to determine whether target data of the data query and the data operation exists. For example, if the working node 110 needs to delete data of a column C1 from a table t1, the working node 110 needs to access a schema object of the table t1 to check whether the column C1 exists in the table t1. Specifically, the working node 101 first searches for the schema object of the table t1 from the local cache 111, and when the working node 101 cannot find the schema object of the table t1 from the local cache 111, searches for the schema object of the table t1 from the global metadata storage 300, to check whether the column C1 exists in the table t1 according to the schema object. When determining that the column C1 exists in the table t1 through checking, the working node 101 performs the operation of deleting the data of the column C1 from the table t1.

As can be seen, after a working node modifies a schema object of a data object O1, if another working node cannot know the modification promptly, when the another working node executes a database transaction or an operation statement on the data object O1, an accessed schema object may still be the schema object of the data object O1 that is not modified. As a result, processing of the database transaction or the operation statement may be abnormal. That is, when a working node modifies metadata of a data object, it is difficult for another working node to know the modification of the metadata promptly. As a result, working nodes use inconsistent metadata when processing transactions, resulting in abnormal transaction processing.

In the embodiments of this application, a transaction is a logical working unit formed by one or more operation statements (for example, operation statements for adding, deleting, checking, or modifying) performed on user data in a database system. A transaction usually has ACID properties, and ACID is the acronym of atomicity, consistency, isolation, and durability. Atomicity means that a transaction is an inseparable working unit and all operations indicated by operation statements of the transaction either occur or do not occur. Consistency means that data integrity needs to be consistent before and after the transaction, or may be understood as that the transaction switches the database system from one correct state to another correct state. The correct state herein may be understood as that data in the database system meets a preset constraint condition. Isolation means that when a plurality of users concurrently access a database system, transactions started by the database system for the users do not interfere with each other. Durability means that once a transaction is committed, the transaction permanently modifies data in the database system.

The abnormality that occurs when a working node cannot know modification of the metadata promptly may have many forms.

For example, in the distributed database system 10, it is assumed that the schema object of the current table t1 has two versions: V1 and V2. In this case, the working node 110 modifies the schema object of the table t1, for example, after deleting the C1 column from the table t1, the working node 110 deletes the index created based on the C1 column from the schema object of the table t1. In this way, a new version of schema object of the table t1 is generated, that is, the schema object of a V3 version. When the schema object of the V3 version is not synchronized to the working node 120, the working node 120 starts a transaction T1. The transaction T1 sequentially includes the following three operation statements: 1. query for columns of the table t1; 2. write a row of data to the table t1; and 3. write another row of data to the table t1. If the schema object of the V3 version is synchronized to the working node 120 after the operation statement 2 of the transaction T1 is executed, in the process of processing the operation statements 1 and 2 of the transaction T1, the schema object of the table t1 accessed by the working node 120 is in the V2 version, and includes the index of the column C1, but in the process of processing the operation statement 3 of the transaction T1, the schema object of the table t1 accessed by the working node 120 is in the V3 version, and does not include the index of the column C1. That is, metadata is inconsistent in the process of processing the same transaction.

To maintain the isolation of concurrent transactions from each other, working nodes in the distributed database system often process transactions through the technology of snapshot isolation. The basic idea of snapshot isolation is to create a new version of a data item when adding, deletion, or modification is performed on the data item, and allocate a timestamp to the new version as version information (for example, a version number) based on a current time. The timestamp herein is usually a value generated by processing the current time using a timestamp function, and may increase as the time increases. When executing an operation statement of any transaction, a working node may obtain a user data snapshot by using a transaction timestamp of the transaction. Version information of the user data snapshot is the transaction timestamp. Only user data whose version information is lower than or equal to the version information of the user data snapshot is visible to the transaction, that is, may be used as to-be-accessed user data of the transaction.

In the foregoing example, when the working node 120 executes the operation statements 1 and 2, the table t1 of to-be-accessed user data no longer includes the data of the column C1. However, the schema object of the V2 version accessed by the working node 120 includes the index of the C1 column. In other words, when a working node cannot know the modification of the metadata promptly, isolation levels of user data and metadata are different for the same transaction or operation statement. To be specific, user data and metadata visible to the working node in a process of processing the transaction or operation statement may be inconsistent. As a result, a final processing result may be incorrect.

Therefore, after a working node modifies the metadata of the data object, it is very important that another working node can know the modification promptly. Based on this, in some implementations, the distributed database system modifies and synchronizes a schema object based on a transaction commit protocol such as two-phase commit (2PC).

Specifically, a working node may consider modification of the schema object as a special transaction, a working node that initiates a schema modification transaction is a coordinator of transaction commit, and another working node that needs to synchronize the modified schema object is a participant of the schema modification transaction. The premise of this solution is that all other nodes (that is, participants) in the distributed database system may be known and connected, and the coordinator and the participants need to maintain states of respective nodes and record logs for usage in the transaction commit protocol. That is, in this manner, a working node needs to have a state and no working node can exit from or join in the system in the process of modifying and synchronizing the schema. Otherwise, modification and synchronization fail.

However, to achieve better scalability and cost-effectiveness, the architecture in which storage and computation are separated from each other and a working node having no state are currently used in most architecture designs in the distributed database field. In this type of distributed database system, a working node having no state is decoupled from a data storage layer, is only responsible for receiving a data operation request from a user and accessing data from the storage layer and performing a processing task according to the data operation request, and stores no persistent data and state. A working node having no state may exit or join at any time due to fault, operation and maintenance, scale out, scale in, or the like. As a result, metadata modification and synchronization based on a transaction commit protocol such as two-phase commit are usually not suitable for this type of distributed database system.

In another implementation, a schema object may be modified and synchronized in a periodic manner. Specifically, a working node that modifies a schema object may write the modified schema object into the global metadata storage, and another working node periodically reads the schema object from the global metadata storage to implement synchronization.

In still another implementation, a schema object may be modified based on a lease and an intermediate state. In this manner, a scheme object on each working node is considered as a schema object state (herein referred to as a "schema state"), and modification and synchronization of a schema object may be considered as modification and synchronization of a schema state. For example, if modification of the schema object of the table t1 is to add an index of a column, the schema object to which the index is not added may be considered as an absent state, and the schema object to which the index is added may be considered as a public state.

According to the lease mechanism, each schema state has a lease period, and each working node needs to renew the lease before the lease ends (that is, the lease period expires). When renewing the lease, the working node needs to check whether the global metadata storage includes a new schema state, and if yes, needs to load the new state into the local cache. If a working node cannot complete lease renewal due to fault or abnormality, the working node no longer provides a service to a database user. The lease mechanism ensures that any working node that may provide a service to a user may obtain the latest schema state within a lease period. To prevent data inconsistency caused because different working nodes have different schema states at a particular moment, a schema intermediate state is used in this type of solution, and the schema intermediate state is valid only for an operation statement of a specific type (for example, delete, insert, or update). If this manner is used, in the foregoing example, only when the schema object on the working node is in the public state, the index added to the schema object of the table t1 on the working node is visible to the outside. When the schema object on the working node is in the absent state or another intermediate state, the added index either does not exist or is invisible to the outside.

As can be seen, in both the periodic manner and the lease and intermediate state manner, after a working node modifies the schema object, another working node can synchronize the modified schema object only after a period of time, that is, cannot know modified metadata promptly. As a result, as described above, the synchronization may occur in a transaction execution process, and consequently schema information visible to different operation statements belonging to the same transaction is different, or user data and schema information visible to the same transaction are inconsistent.

Based on this, the embodiments of this application propose a database transaction processing method and apparatus and a server, to ensure that before a target transaction is started, modified metadata is promptly known by a working node that needs to use the metadata. This is described below.

Figure 2:
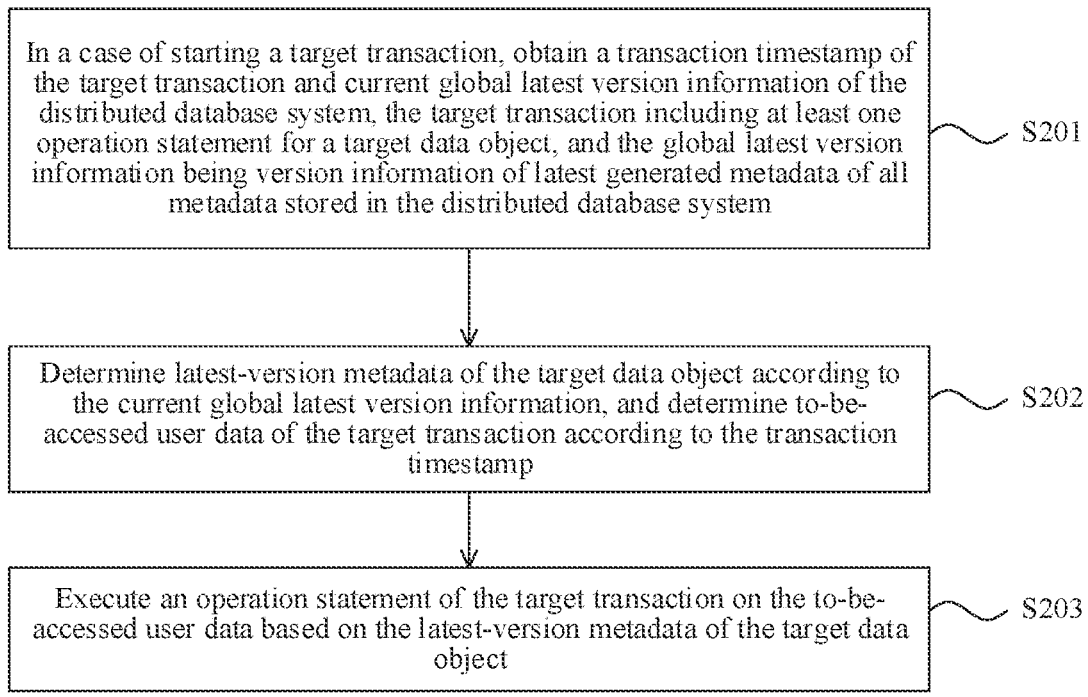
FIG. 2 is a schematic flowchart of a database transaction processing method according to an embodiment of this application.

FIG. 2 is a schematic flowchart of a database transaction processing method according to an embodiment of this application. This method may be applied to any working node shown in FIG. 1. Detailed descriptions are as follows.

S201: In a case of starting a target transaction, obtain a transaction timestamp of the target transaction and current global latest version information of the distributed database system, the target transaction including at least one operation statement for a target data object, and the global latest version information being version information of latest generated metadata of metadata stored in the distributed database system.

Starting the target transaction may mean that the target transaction starts to be executed. The transaction timestamp of each transaction may be a value generated by the global timestamp manager 400 based on current time information when the transaction is started. For example, when the transaction is started, the current time information may be processed based on a timestamp function to obtain a function value, and the function value may be used as the transaction timestamp of the transaction. In some embodiments, the timestamp function usually monotonically increases, and correspondingly, the transaction timestamp of the transaction also increases as the start time of the transaction increases.

In this embodiment, when obtaining any version of metadata of any data object, the working node may request the global timestamp manager 400 to allocate version information to the metadata. Specifically, the version information of the metadata may also be a value generated by the global timestamp manager 400 by processing current time information based on a timestamp function. In this embodiment, the global timestamp manager 400 may generate the version information of the metadata and the transaction timestamp of the transaction based on the same timestamp function. In this case, the version information of the metadata and the transaction timestamp of the transaction belong to the same timestamp sequence. The global timestamp manager 400 may alternatively generate the version information of the metadata and the transaction timestamp of the transaction based on different timestamp functions. In this case, the version information of the metadata and the transaction timestamp of the transaction belong to different timestamp sequences. This is not limited in this embodiment.

When version information of metadata is a timestamp generated based on time information, version information of the same metadata has a time sequence, and version information of different metadata also has a time sequence.

For example, the distributed database system 10 includes metadata md1 and md2. The metadata md1 has two versions: V11 and V12, and the metadata md2 has two versions: V21 and V22. In this case, V11, V12, V21, and V22 have a time sequence, and the time sequence may be reflected by a value sequence among V11, V12, V21, and V22. When the timestamp function is a monotonically increasing function, metadata with the larger version information is generated at a later time and is newer. In the following, for example, the timestamp function monotonically increases unless otherwise described.

Then, in version information of all metadata stored in the distributed database system 10, there must be maximum version information, and metadata with this version information is the latest generated metadata. For example, when the distributed database system 10 only stores the metadata md1 and md2, if V22 is the maximum version information, the metadata md2 with the version information V22 is the latest generated metadata.

The global timestamp manager 400 may store global latest version information. The global latest version information is version information of the latest generated metadata, for example, the metadata md2 with the version information V22 in the foregoing example, of all the metadata of the distributed database system 10. Therefore, the global latest version information of the distributed database system 10 changes as the metadata in the system 10 is modified. When new metadata is generated in the system 10, the global latest version information is updated. Correspondingly, the current global latest version information described in S201 is global latest version information obtained from the global timestamp manager by the working node when the target transaction is started, and indicates version information of latest metadata generated in the distributed database system 10 before the target transaction is started.

S202: Determine latest-version metadata of the target data object according to the current global latest version information, and determine to-be-accessed user data of the target transaction according to the transaction timestamp.

In this embodiment, the working node may access the global metadata storage 300 based on the global latest version information obtained in S201, that is, the current global latest version information, to obtain a metadata snapshot. This is equivalent to using metadata whose version information is lower than or equal to the current global latest version information as to-be-accessed metadata. Then, the working node may search for the latest-version metadata of the target data object, that is, metadata with the maximum version information of various versions of metadata of the target data object, from the to-be-accessed metadata.

In addition, the working node may further use the transaction timestamp of the target transaction as the user data snapshot, to determine user data visible to the target transaction, that is, user data whose version information is lower than or equal to the transaction timestamp. The determined user data visible to the target transaction is the to-be-accessed user data, that is, user data that may be accessed in the process of processing the target transaction.

S203: Execute an operation statement of the target transaction on the to-be-accessed user data based on the latest-version metadata of the target data object.

In an implementation process, the working node may access the latest-version metadata (for example, schema information) of the target data object, parse the operation statement of the target transaction according to the latest-version metadata of the target data object, and process the to-be-accessed user data according to a parsing result. The parsing herein, for example, may be checking whether a processing object (for example, a data table, or a row, a column, or a primary key in the data table) of the operation statement of the target transaction exists. When the parsing result is that the processing object exists, the working node may continue to execute the operation statement.

According to the procedure shown in FIG. 2, modification of any metadata in the distributed database system may trigger the update of global version information, and when starting the target transaction, the working node determines the latest-version metadata of the target data object based on the current global latest version information. Therefore, this can ensure that the metadata that is modified before the target transaction is started can be known by the working node promptly. In other words, if metadata is modified before the target transaction is started and the working node needs to use the metadata during the execution of the target transaction, this solution can ensure that the working node uses the modified metadata in the process of executing the entire target transaction.

Further, because this solution can ensure that the working node uses the modified metadata in the process of executing the entire target transaction, this can avoid inconsistency of accessed metadata in the process of executing different operation statements of the same transaction. In addition, in this solution, the working node obtains the modified metadata at the very beginning. This can avoid the problem in the previous example that user data and metadata visible to the same transaction are inconsistent because modification of metadata cannot be seen promptly.

Figure 3:
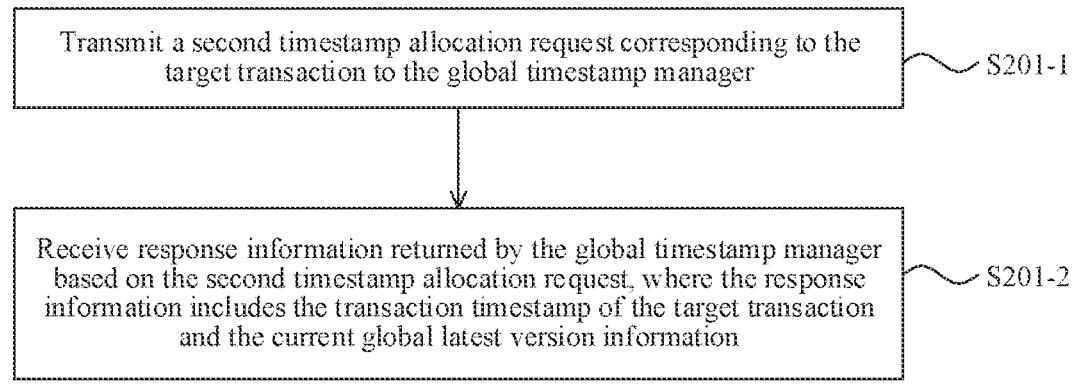
FIG. 3 is a schematic diagram of sub-steps of step S201 shown in FIG. 2.

Refer to both FIG. 2 and FIG. 3. The following further describes the procedure shown in FIG. 2. Specifically, the step of obtaining a transaction timestamp of the target transaction and current global latest version information of the distributed database system in S201 may be implemented through a procedure shown in FIG. 3:

S201-1: Transmit a second timestamp allocation request corresponding to the target transaction to the global timestamp manager.

The second timestamp allocation request is a timestamp allocation request sent for a transaction, and is used to request the global timestamp manager 400 to allocate a transaction timestamp to the transaction. It may be understood that the second timestamp allocation request herein is only used to distinguish from the first timestamp allocation request below. "First" and "second" do not limit the importance of the timestamp requests.

S201-2: Receive response information returned by the global timestamp manager based on the second timestamp allocation request, where the response information includes the transaction timestamp of the target transaction and the current global latest version information.

In this embodiment, when receiving the second timestamp allocation request, the global timestamp manager 400 may generate a timestamp as the transaction timestamp based on the current time information and obtain the current global latest version information, fill the response information corresponding to the second timestamp allocation request with the transaction timestamp and the current global latest version information, and transmit the response information to the working node. The two operations of generating the transaction timestamp and obtaining the current global latest version information are characterized by atomicity, that is, either the two operations occur or neither of the two operations occurs. In an implementation process, atomicity of the two operations may be implemented by setting an atomic lock for the two operations. Certainly, atomicity of the two operations may be alternatively implemented in another manner. This is not limited in this embodiment.

The procedure shown in FIG. 3 can ensure that the transaction timestamp of the target transaction and the current global latest version information basically correspond to the same time point. Correspondingly, the to-be-accessed user data determined based on the transaction timestamp and the latest-version metadata of the target data object determined based on the current global latest version information are versions corresponding to each other.

Figure 4:
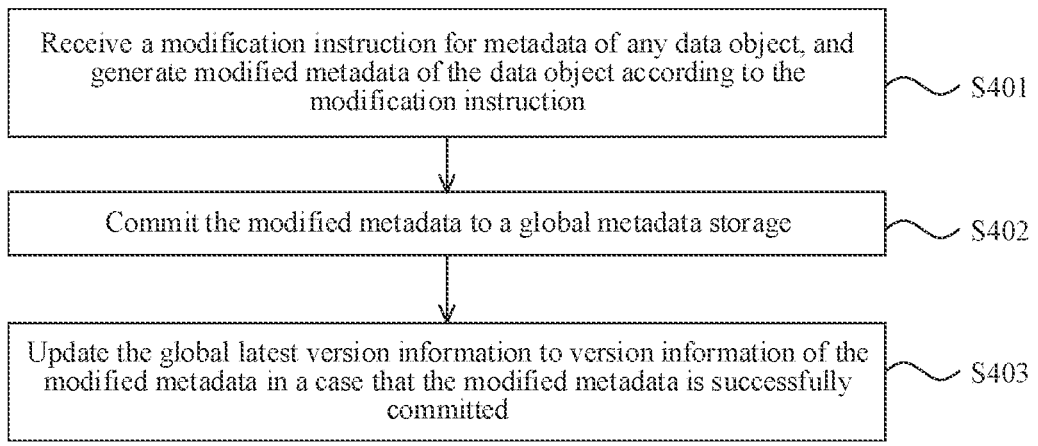
FIG. 4 is another schematic flowchart of a database transaction processing method according to an embodiment of this application.

In this embodiment, the global latest version information maintained by the global timestamp manager 400 may be updated through the procedure shown in FIG. 4.

S401: Receive a modification instruction for metadata of any data object, and generate modified metadata of the data object according to the modification instruction.

The modification instruction herein may be any instruction that may modify the metadata, for example, an instruction for performing an operation such as addition, deletion, or modification. The modification instruction may be inputted by a user or a database manager, or may be triggered by an operation performed on a data object. This is not limited in this embodiment.

When receiving a modification instruction for metadata of any data object, each working node in the distributed database system 10 may obtain a snapshot of metadata of a current version of the data object. Version information of the snapshot may be a timestamp generated based on current time information. Then, the working node executes the modification instruction on the metadata of the data object, to obtain metadata of a new version of the data object, that is, modified metadata.

In this case, the working node may request the global timestamp manager 400 to allocate version information to the modified metadata. Based on this, the database transaction processing method provided in this embodiment may further include steps shown in FIG. 5.

S501: Transmit a first timestamp allocation request to a global timestamp manager when the modified metadata is generated.

S502. Receive a timestamp returned by the global timestamp manager based on the first timestamp allocation request, and determine the timestamp as the version information of the modified metadata.

In this embodiment, the first timestamp allocation request is a timestamp allocation request sent for the metadata, and the timestamp returned based on the first timestamp allocation request is the version information of the metadata.

When receiving the first timestamp allocation request sent by the working node, the global timestamp manager 400 may generate the timestamp based on the current time information, add the timestamp to the response information corresponding to the first timestamp allocation request, and return the response information to the working node. The working node receives the response information, extracts the timestamp from the response information, and determines the extracted timestamp as the version information of the modified metadata.

S402: Commit the modified metadata to a global metadata storage.

Figure 5:
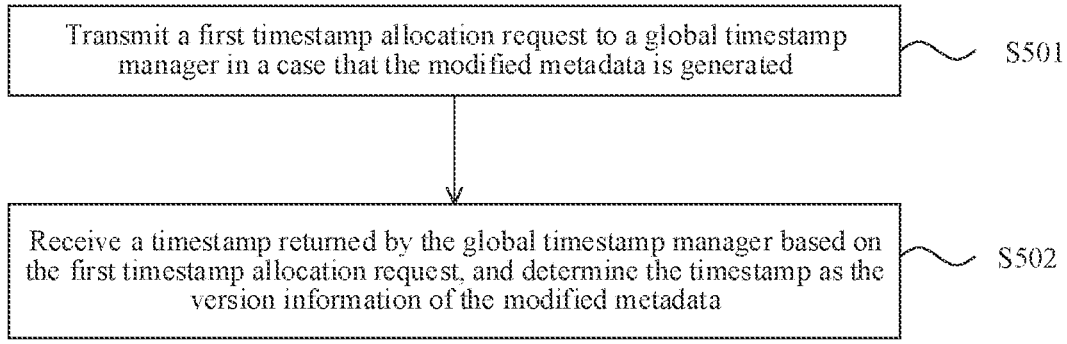
FIG. 5 is still another schematic flowchart of a database transaction processing method according to an embodiment of this application.

In this embodiment, the steps shown in FIG. 5 may be performed before S402. In an implementation process, the working node may commit the modified metadata and the version information of the modified metadata to the global metadata storage 300, and the modified metadata and the version information of the modified metadata are written into the global metadata storage 300. The global metadata storage 300 may return commit confirmation information after the modified metadata and the version information are successfully written into the global metadata storage 300. In this case, the modified metadata and the version information of the modified metadata are persistently stored in the global metadata storage 300.

S403: Update the global latest version information to version information of the modified metadata when the modified metadata is successfully committed.

If the working node receives the commit confirmation information returned by the global metadata storage 300, it may be considered that the modified metadata has been successfully committed. Therefore, the working node may transmit a commit success notification to the global timestamp manager 400 when receiving the commit confirmation information returned by the global metadata storage 300. For example, the commit success notification may include the version information of the modified metadata, so that the global timestamp manager 400 may modify the stored global latest version information to the version information of the modified metadata according to the received commit success notification.

Specifically, when receiving the commit success notification, the global timestamp manager 400 may determine, based on the version information of the modified metadata carried in the commit success notification, that the metadata with the version information has been successfully committed to the global metadata storage 300, and then may update the stored global latest version information to the version information carried in the commit success notification, that is, the version information of the modified metadata.

In this embodiment, when the modified metadata is not successfully committed, the working node may repeatedly perform S402. It may be understood that, the working node maintains a persistent log or task queue in the process of modifying the metadata, where the persistent log or task queue records a modification progress of the metadata. If the working node that modifies the metadata becomes faulty in the process of modifying the metadata, the working node or another working node may continue to modify the metadata based on the persistent log or task queue after recovery, until the modified metadata is successfully committed.

In this embodiment, the global latest version information may be understood as a variable, and update of the global latest version information may be understood as update of the value of the variable. To distinguish from another variable described below, in this specification, the global latest version information may be referred to as a first variable.

The procedure shown in FIG. 4 can ensure that the global latest version information stored by the global timestamp manager 400 is the version information of the latest generated metadata in the distributed database system 10.

For ease of description, it is agreed that the target data object of the target transaction is referred to as a first data object. As described above, modification of the metadata made by any working node triggers update of the global latest version information in the global timestamp manager 400. Therefore, before the target transaction is started, no metadata of a new version of the target data object is generated, or metadata of a new version has been synchronized to the local cache of the working node that starts the target transaction. In this case, the latest metadata of the target data object in the local cache of the working node is already the latest metadata of the target data object in the distributed database system 10. In this case, the working node does not need to access the global metadata storage 300 in the process of performing S202.

Figure 6:
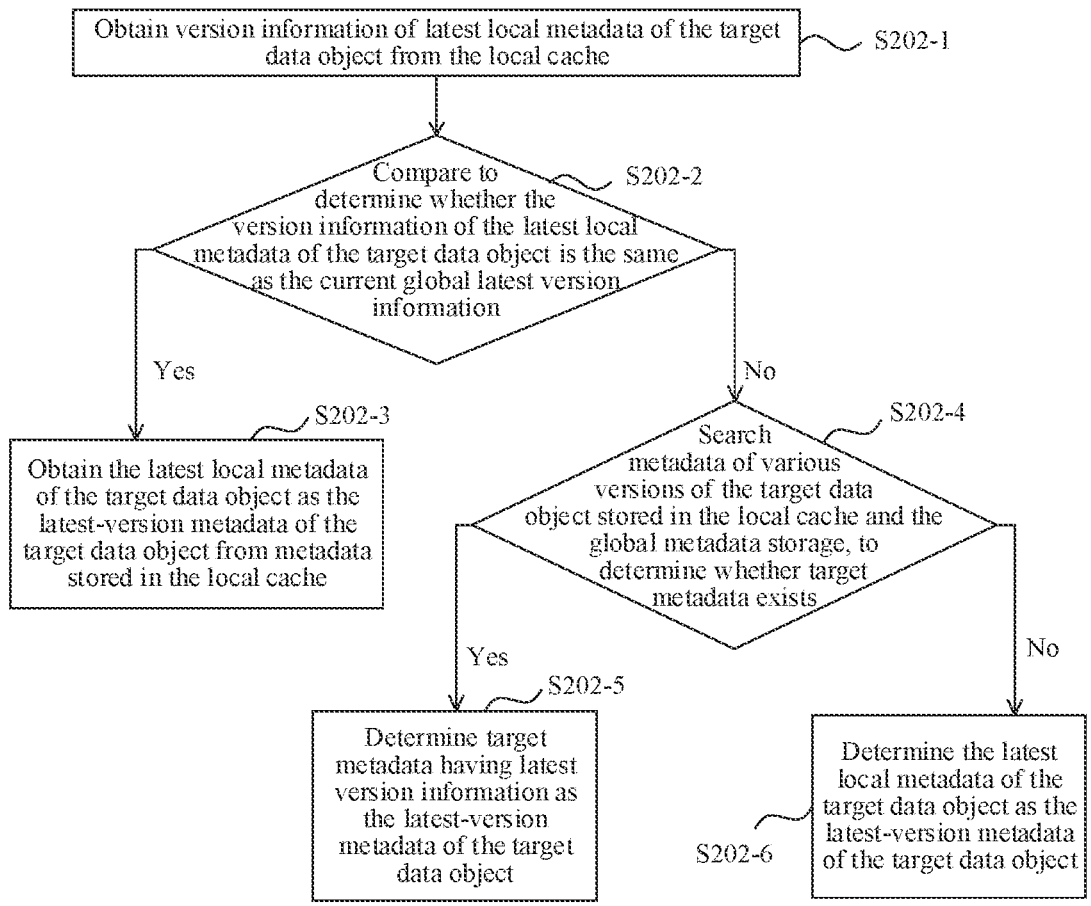
FIG. 6 is a schematic diagram of sub-steps of step S202 shown in FIG. 2.

Therefore, to avoid unnecessary access to the global metadata storage 300 by the working node to reduce the number of network input/outputs (IO) and network bandwidth occupation and improve system performance, in this embodiment, S202 shown in FIG. 2 may be implemented through a procedure shown in FIG. 6.

S202-1: Obtain version information of latest local metadata of the target data object from the local cache.

The local cache is a local cache of the working node that starts the target transaction. The local cache of each working node may maintain the version information of the latest local metadata of each data object. The version information of the latest local metadata described herein may be understood as a variable and is referred to as a second variable herein. The value of the second variable may be updated. The local cache of each working node includes the second variable corresponding to each data object.

For example, the local cache 121 of the working node 120 includes the second variable of each data object in the distributed database system 10. The value of the second variable represents the version information of the latest metadata of the data object in the local cache 121. For example, the data object is the data table t1. The local cache 121 stores various versions of metadata of the data table t1. The value of the second variable of the data table t1 in the local cache 121 represents the latest version information of version information of various versions of metadata.

For example, the database transaction processing method provided in this embodiment is applied to the working node 120 shown in FIG. 1. If the working node 120 starts a transaction T2 and the transaction T2 includes at least one operation statement for the data table t2, the transaction T2 may be considered as the target transaction, the working node 120 may be considered as a node that starts and processes the target transaction T2, the data table t2 may be considered as the target data object (or the first data object), and the local cache 121 of the working node 120 may be considered as the local cache in S202-1.

In an implementation process, the working node 120 may search for the second variable of the data table t2 from the local cache 121 and obtain the current value of the second variable. The current value is the version information of the latest metadata of the data table t2 in the local cache 121.

S202-2: Compare to determine whether the version information of the latest local metadata of the target data object is the same as the current global latest version information. If yes, perform S202-3. If not, perform S202-4.

S202-3: Obtain the latest local metadata of the target data object as the latest-version metadata of the target data object from metadata stored in the local cache.

In this embodiment, to determine whether the latest local metadata of the target data object in the local cache is latest global metadata of the target data object, the version information of the latest local metadata of the target data object obtained in S202-1 may be compared with the current global latest version information obtained in S201.

If the version information of the latest local metadata and the current global latest version information are the same, it means that the latest local metadata of the target data object in the local cache is the latest global metadata in the distributed database system 10, and the latest local metadata may be directly obtained from the local cache without accessing the global metadata storage 300.

S202-4: Search metadata of various versions of the target data object stored in the local cache and the global metadata storage, to determine whether target metadata exists, where version information of the found target metadata is higher than the version information of the latest local metadata of the target data object, and is not higher than the current global latest version information. If yes, perform S202-5. If not, perform S202-6.

S202-5: Determine target metadata having latest version information of the found target metadata as the latest-version metadata of the target data object.

If the version information of the latest local metadata of the target data object in the local cache is different from the current global latest version information, it means that the metadata has been modified once or for more times before the target transaction is started, and modification of metadata once or for more times triggers the update of the global latest version information. Modification of metadata once or for more times may or may not include modification of metadata of the target data object.

If modification of metadata once or for more times includes modification of metadata of the target data object, the local cache or the global metadata storage 300 certainly includes the target metadata, that is, metadata whose version information is between the version information of the latest local metadata of the first data object and the current global latest version information. This is because the update of the global latest version information is performed after the modified metadata is successfully committed to the global metadata storage 300. Therefore, all metadata with the current global latest version information and previous version information has been written to the global metadata storage 300 and may be found.

The target metadata with the latest version information of various versions of metadata of the target data object is generated in the last modification, that is, the latest-version metadata of the target data object in the distributed database system 10. Correspondingly, the working node may update the target metadata with the latest version information to the local cache, so that the local cache stores the latest-version metadata of the target data object, and update the version information of the latest local metadata of the target data object to the version information of the latest-version target metadata (that is, the version information of the latest-version metadata of the target data object).

S202-6: Determine the latest local metadata of the target data object as the latest-version metadata of the target data object.

If modification of metadata once or for more times does not include modification of target metadata, the latest local metadata of the target data object is already the latest-version metadata of the target data object in the distributed database system 10. In other words, the metadata of the target data object stored in the local cache or the global metadata storage 300 does not include the target metadata. Therefore, when the working node cannot find the target metadata in S202-4, the working node may directly use the latest local metadata of the target data object as the latest-version metadata of the target data object.

It may be understood that, all the latest-version metadata of the target data object described in S202, S202-3, S202-5, and S202-6 is latest-version metadata of the target data object in the entire distributed database system 10.

In this embodiment, after performing S202-6, the working node may further update the version information (that is, the value of the second variable) of the latest local metadata of the target data object in the local cache as the current global latest version information (that is, the current value of the first variable).

Figure 7:
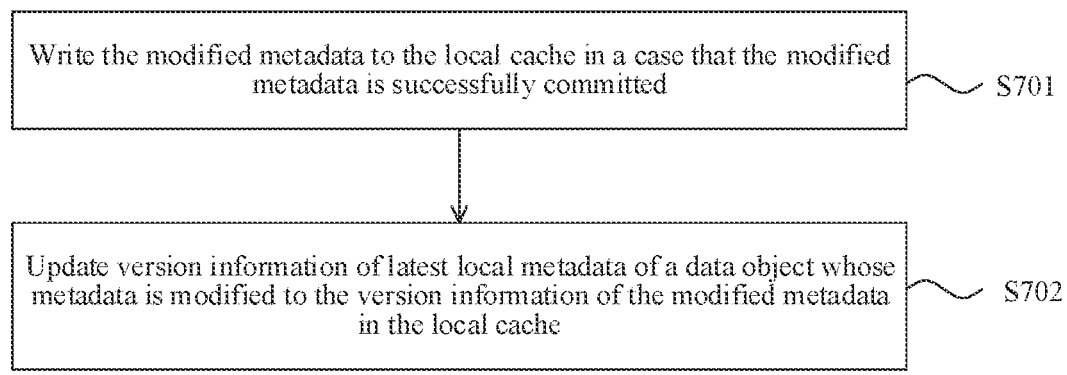
FIG. 7 is yet another schematic flowchart of a database transaction processing method according to an embodiment of this application.

In addition, in this embodiment, the modified metadata not only needs to be written into the global metadata storage 300, but also needs to be synchronized to each working node. The working node that generates the modified metadata may synchronize the modified metadata through the procedure shown in FIG. 7. Correspondingly, the working node that generates modified metadata may update the second variable of the data object whose metadata is modified. Detailed descriptions are as follows.

S701: Write the modified metadata to the local cache when the modified metadata is successfully committed.

In an implementation process, when committing the modified metadata to the global metadata storage 300 and receiving commit confirmation information returned by the global metadata storage 300, the working node may write the modified metadata into the local cache.

S702: Update version information of latest local metadata of a data object whose metadata is modified to the version information of the modified metadata in the local cache.

The data object whose metadata is modified is a data object of the modified metadata. After successfully writing the modified metadata into the local cache, the working node may modify the version information (that is, the value of the second variable) of the latest local metadata of the data object of the modified metadata to the version information of the modified metadata.

The following provides some specific examples with reference to the scenario shown in FIG. 1, to describe the database transaction processing method in this embodiment in detail, so that a person skilled in the art can more clearly understand this solution.

It is assumed that in an initial state, the distributed database system 10 includes data tables t1, t2, and t3. Metadata of the data table t1 is a schema object O1 of a V10 version, metadata of the data table t2 is a schema object O2 of a V20 version, and metadata of the data table t3 is a schema object O3 of a V30 version.

The global metadata storage 300 stores the schema object O1 of the V10 version, the schema object O2 of the V20 version, and the schema object O3 of the V30 version. The global metadata storage 300 maintains a first variable of global largest schema version (GLSV). The current value of the GLSV is V20. This means that the current maximum version information in the distributed database system 10 is V20, that is, the latest version information is V20.

The local caches 111, 121, and 131 all cache the schema object O1 of the V10 version, the schema object O2 of the V20 version, and the schema object O3 of the V30 version, and all maintain a second variable of equivalent global schema version-1 (EGSV-1) corresponding to the data table t1, a second variable EGSV-2 corresponding to the data table t2, and a second variable EGSV-3 corresponding to the data table t3. The current value of the EGSV-1 is V10, the current value of the EGSV-2 is V20, and the current value of the EGSV-3 is V30.

Figure 8:
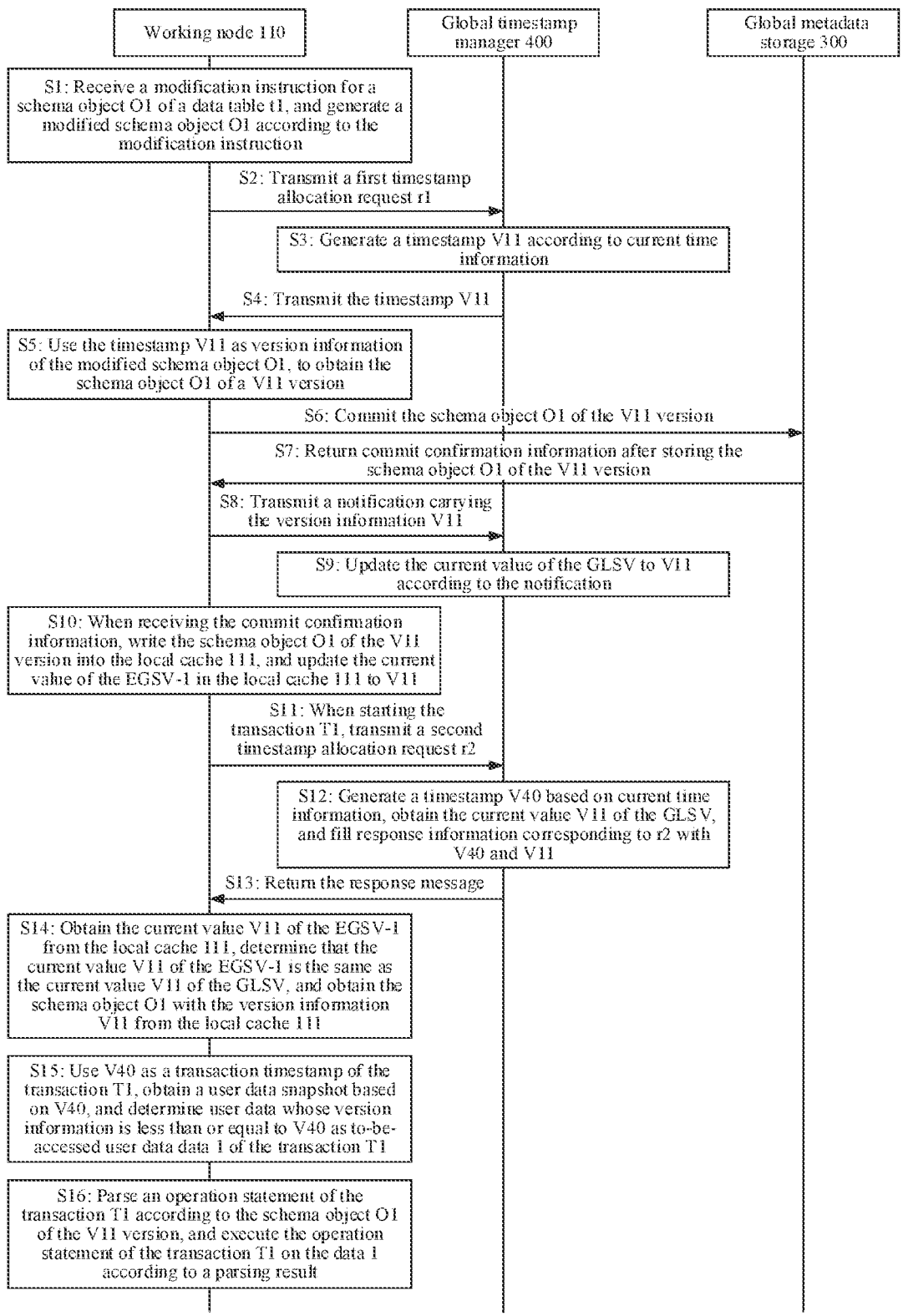
FIG. 8 is a flowchart of interaction in a database transaction processing method in a specific example according to an embodiment of this application.

In an example, the database transaction processing method provided in this embodiment may include a procedure shown in FIG. 8.

S1: The working node 110 receives a modification instruction for the schema object O1 of the data table t1, and generates a modified schema object O1 according to the modification instruction.

S2: The working node 110 transmits a first timestamp allocation request r1 to the global timestamp manager 400.

S3: The global timestamp manager 400 generates a timestamp V11 according to current time information.

S4: The global timestamp manager 400 transmits the timestamp V11 to the working node 110.

S5: The working node 110 uses the timestamp V11 as version information of the modified schema object O1, to obtain the schema object O1 of a V11 version.

S6: The working node 110 commits the schema object O1 of the V11 version to the global metadata storage 300.

S7: The global metadata storage 300 returns commit confirmation information to the working node 110 after storing the schema object O1 of the V11 version.

S8: The working node 110 transmits a notification to the global timestamp manager 400 when receiving the commit confirmation information, where the notification carries the version information V11.

S9: The global timestamp manager 400 updates the current value of the GLSV to V11 according to the notification.

S10: When receiving the commit confirmation information, the working node 110 writes the schema object O1 of the V11 version into the local cache 111, and updates the current value of the EGSV-1 in the local cache 111 to V11.

S8 and S10 may be performed in parallel.

In this case, if the working node 110 starts the transaction T1 and the transaction T1 includes an operation statement for the data table t1, the working node 110 may perform processing according to the following procedure.

S11: When starting the transaction T1, the working node 110 transmits a second timestamp allocation request r2 to the global timestamp manager 400. It may be understood that the transaction T1 herein is the target transaction.

S12: The global timestamp manager 400 receives r2, generates a timestamp V40 based on current time information, obtains the current value V11 of the GLSV, and fills response information corresponding to r2 with V40 and V11.

S13: The global timestamp manager 400 returns the response information corresponding to r2 to the working node 110.

S14: The working node 110 obtains the current value V11 of the EGSV-1 from the local cache 111, determines that the current value V11 of the EGSV-1 is the same as the current value V11 of the GLSV, and obtains the schema object O1 with the version information V11 from the local cache 111.

S15: The working node 110 uses V40 as a transaction timestamp of the transaction T1, obtains a user data snapshot based on V40, and determines user data whose version information is lower than or equal to V40 as to-be-accessed user data data 1 of the transaction T1.

S16: Parse an operation statement of the transaction T1 according to the schema object O1 of the V11 version, and execute the operation statement of the transaction T1 on the data 1 according to a parsing result.

Figure 9:
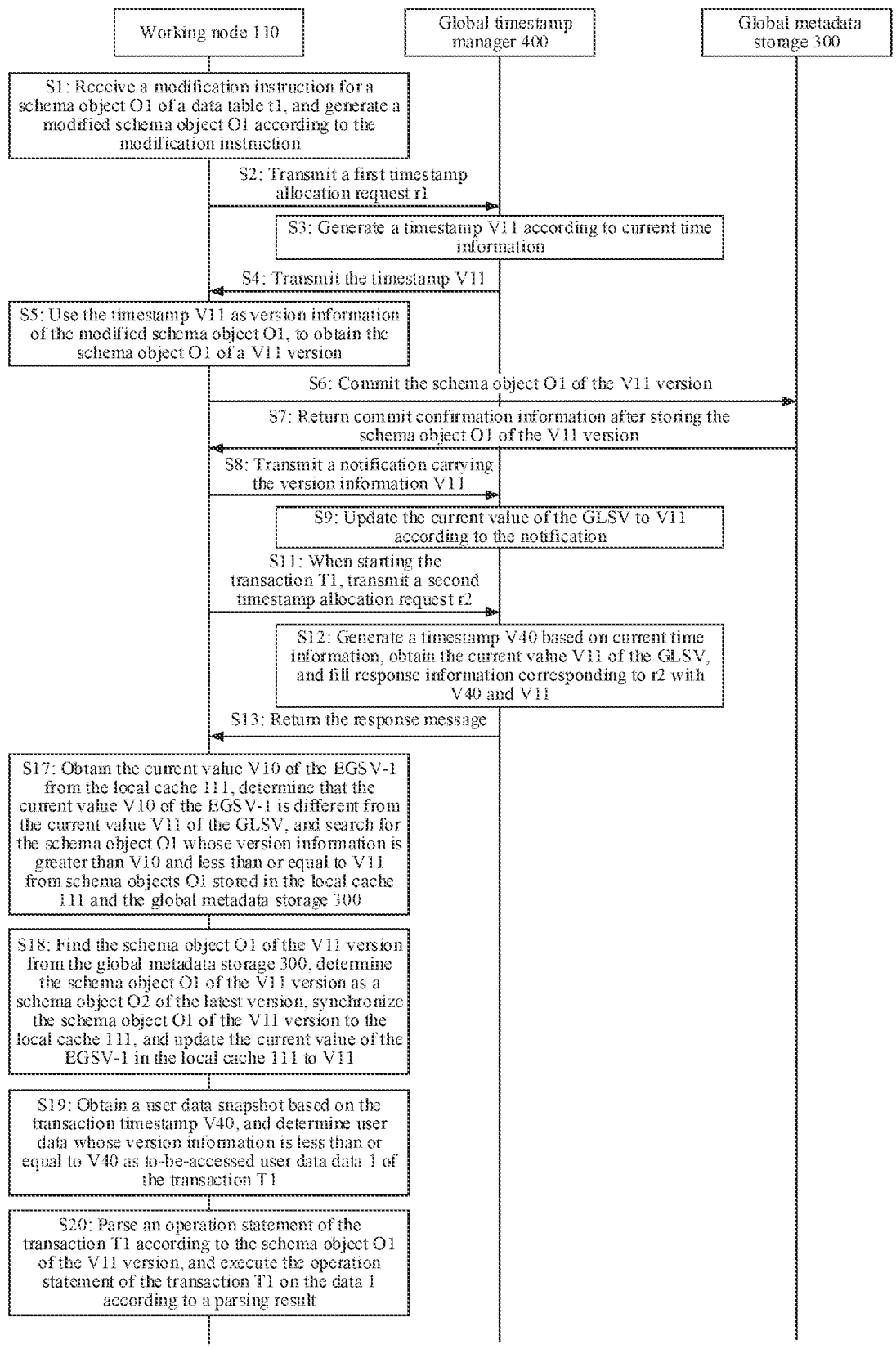
FIG. 9 is a flowchart of interaction in a database transaction processing method in another specific example according to an embodiment of this application.

In another example, if the working node 110 is started after S9 is executed and S10 is not executed, the database transaction processing method provided in this embodiment may be first performed according to S11 to S13, and then may be performed according to a procedure shown in FIG. 9 after S13.

S17: The working node 110 obtains the current value V10 of the EGSV-1 from the local cache 111, determines that the current value V10 of the EGSV-1 is different from the current value V11 of the GLSV, and searches for the schema object O1 (that is, the target metadata) whose version information is higher than V10 and lower than or equal to V11 from schema objects O1 stored in the local cache 111 and the global metadata storage 300.

S18: The working node 110 finds the schema object O1 of the V11 version from the global metadata storage 300, determines the schema object O1 of the V11 version as the schema object O1 of the latest version, synchronizes the schema object O1 of the V11 version to the local cache 111, and updates the current value of the EGSV-1 in the local cache 111 to V11.

S19: The working node 110 obtains a user data snapshot based on the transaction timestamp V40, and determines user data whose version information is lower than or equal to V40 as to-be-accessed user data data 1 of the transaction T1.

S20: The working node 110 parses an operation statement of the transaction T1 according to the schema object O1 of the V11 version, and executes the operation statement of the transaction T1 on the data 1 according to a parsing result.

Based on the foregoing example, the working node 110 receives a modification instruction for the schema object O2 of the data table t2 at a moment 2, and may perform processing according to a procedure similar to that of S1 to S10. After the processing is completed, the schema object O2 of a new version (V21) is added to the global metadata storage 300, where the current value of the GLSV is V21. The schema object O2 of the V21 version is added to the local cache 111 of the working node 110, and the current value of the EGSV-2 in the local cache 111 is V21. However, the working nodes 120 and 130 do not include the schema object O2 of the V21 version, and the current value of the EGSV-2 in the local caches 121 and 131 is still V20.

Figure 10:
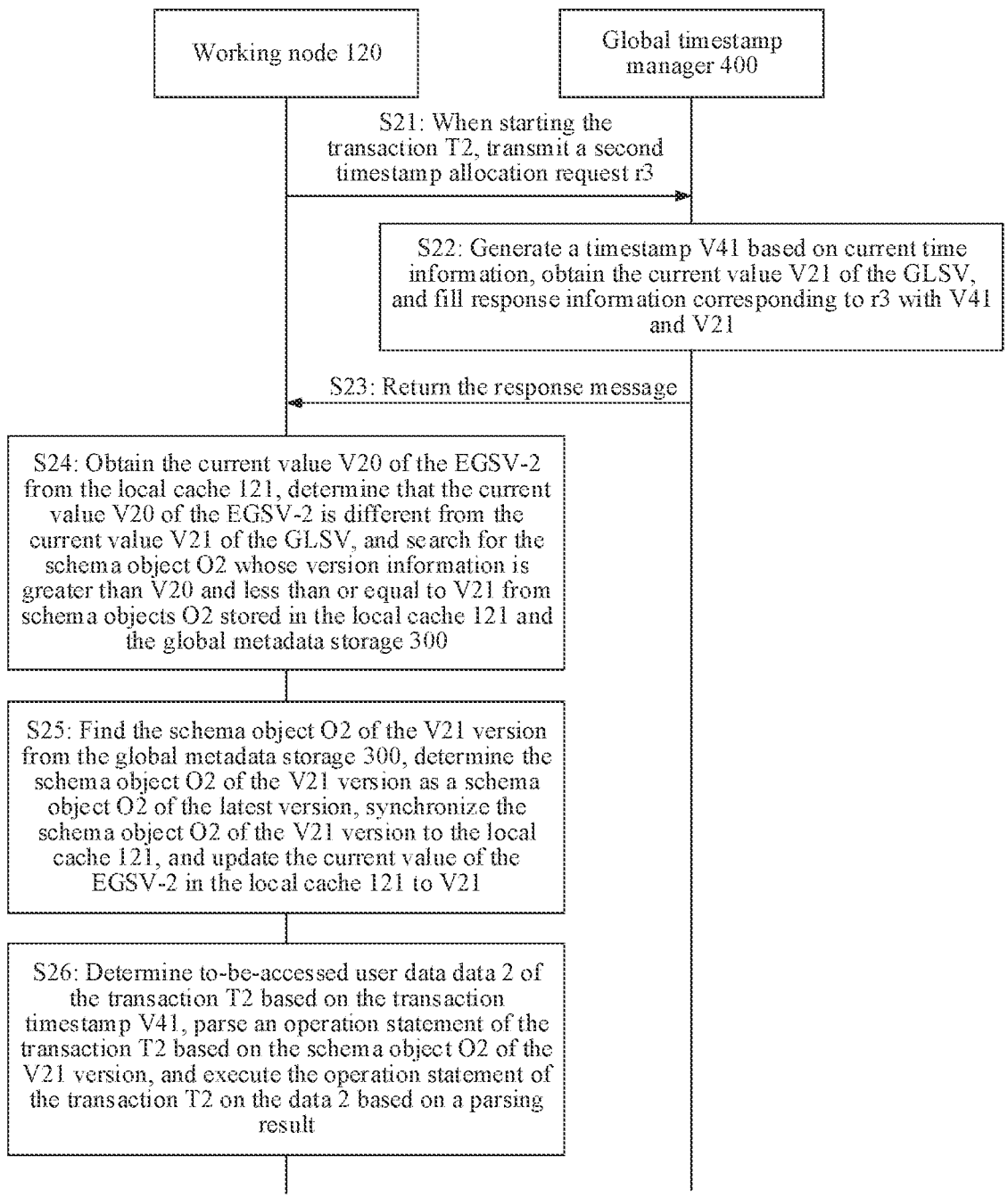
FIG. 10 is a flowchart of interaction in a database transaction processing method in still another specific example according to an embodiment of this application.

In this case, if the working node 120 starts a transaction T2 and the transaction T2 includes an operation statement for the data table t2, the database transaction processing method provided in this embodiment may be performed according to a procedure shown in FIG. 10.

S21: When starting the transaction T2, the working node 120 transmits a second timestamp allocation request r3 to the global timestamp manager 400. The transaction T2 herein may be considered as the target transaction.

S22: The global timestamp manager 400 receives r3, generates a timestamp V41 based on current time information, obtains the current value V21 of the GLSV, and fills response information corresponding to r3 with V41 and V21.

S23: The global timestamp manager 400 returns the response information to the working node 120.

S24: The working node 120 obtains the current value V20 of the EGSV-2 from the local cache 121, determines that the current value V20 of the EGSV-2 is different from the current value V21 of the GLSV, and searches for the schema object O2 (that is, the target metadata) whose version information is higher than V20 and lower than or equal to V21 from schema objects O2 stored in the local cache 121 and the global metadata storage 300.

S25: The working node 120 finds the schema object O2 of the V21 version from the global metadata storage 300, determines the schema object O2 of the V21 version as a schema object O2 of the latest version, synchronizes the schema object O2 of the V21 version to the local cache 121, and updates the current value of the EGSV-2 in the local cache 121 to V21.

S26: The working node 120 determines to-be-accessed user data data 2 of the transaction T2 based on the transaction timestamp V41, parses an operation statement of the transaction T2 based on the schema object O2 of the V21 version, and executes the operation statement of the transaction T2 on the data 2 based on a parsing result.

Figure 11:
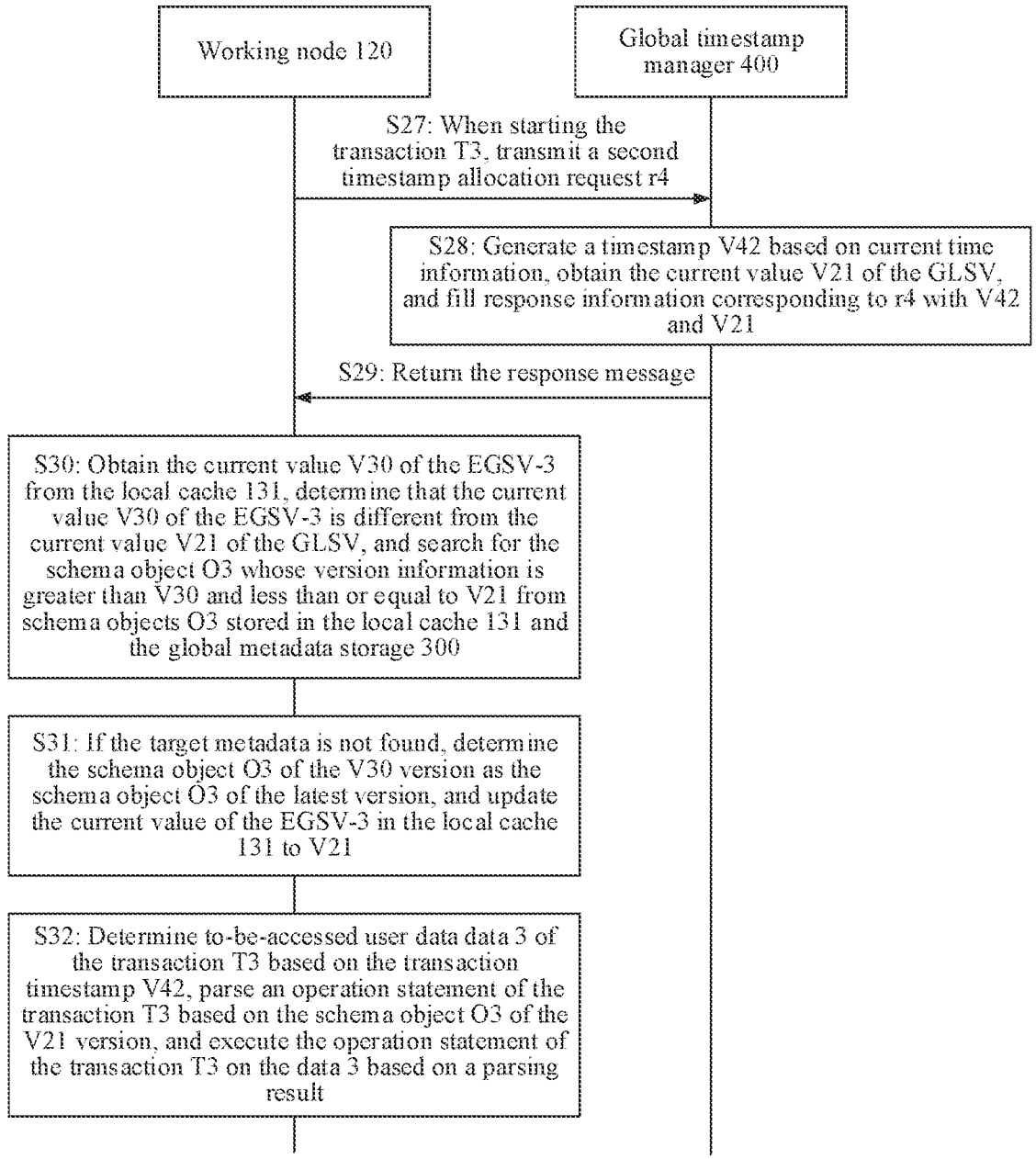
FIG. 11 is a flowchart of interaction in a database transaction processing method in yet another specific example according to an embodiment of this application.

Based on the foregoing example, the working node 130 starts a transaction T3 at a moment 3 and the transaction T3 includes an operation statement for the data table t3. In this case, the database transaction processing method provided in this embodiment may be performed according to a procedure shown in FIG. 11.

S27: When starting the transaction T3, the working node 130 transmits a second timestamp allocation request r4 to the global timestamp manager 400. The transaction T3 herein may be considered as the target transaction.

S28: The global timestamp manager 400 receives r4, generates a timestamp V42 based on current time information, obtains the current value V21 of the GLSV, and fills response information corresponding to r4 with V42 and V21.

S29: The global timestamp manager 400 returns the response information to the working node 130.

S30: The working node 130 obtains the current value V30 of the EGSV-3 from the local cache 131, determines that the current value V30 of the EGSV-3 is different from the current value V21 of the GLSV, and searches for the schema object O3 (that is, the target metadata) whose version information is higher than V30 and lower than or equal to V21 from schema objects O3 stored in the local cache 131 and the global metadata storage 300.

S31: If the working node 130 does not find the target metadata, the working node 130 determines the schema object O3 of the V30 version as the schema object O3 of the latest version, and updates the current value of the EGSV-3 in the local cache 131 to V21.

S32: The working node 130 determines to-be-accessed user data data 3 of the transaction T3 based on the transaction timestamp V42, parses the operation statement of the transaction T3 based on the schema object O3 of the V21 version (that is, the scheme object O3 of the V30 version), and executes the operation statement of the transaction T3 on the data 3 based on a parsing result.

According to the technical solutions provided in this application, the distributed database system maintains the global latest version information, where the global latest version information is version information of metadata with the latest version information of all metadata in the system. When starting the target transaction for the target data object, the working node may obtain the transaction timestamp and the current global latest version information, determine the latest-version metadata of the target data object according to the current global latest version information, determine user data visible to the target transaction as to-be-accessed user data according to the transaction timestamp, and execute the operation statement of the target transaction on the to-be-accessed user data of the target transaction based on the latest-version metadata of the target data object. Modification of any metadata in the distributed database system may trigger the update of global version information, and when starting the target transaction, the working node determines the latest-version metadata of the target data object based on the current global latest version information. Therefore, this can ensure that the metadata that is modified before the target transaction is started may be promptly visible to the working node that needs to use the metadata. In addition, the technical solutions of this application can be easily implemented or applied in a mainstream database management system that already supports concurrent control over a plurality of versions, do not significantly increase performance overheads, and do not affect availability and scalability of the distributed database system.

Figure 12:
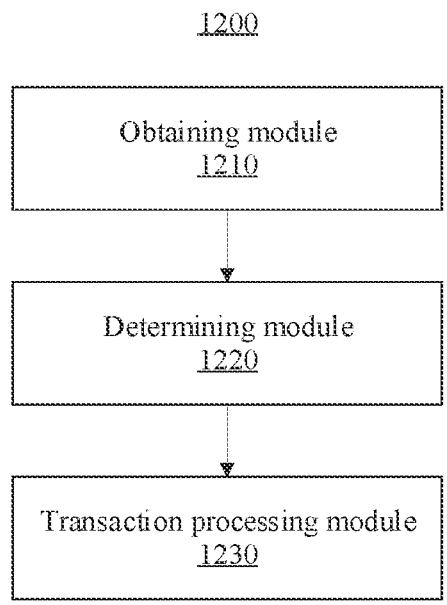
FIG. 12 is a block diagram of a database transaction processing apparatus according to an embodiment of this application.

FIG. 12 is a structural block diagram of a database transaction processing apparatus 1200 according to an embodiment of this application. The apparatus 1200 may include: an obtaining module 1210, a determining module 1220, and a transaction processing module 1230.

The obtaining module 1210 is configured to: in a case of starting a target transaction, obtain a transaction timestamp of the target transaction and current global latest version information of the distributed database system, the target transaction including at least one operation statement for a target data object, and the global latest version information being version information of latest generated metadata of metadata stored in the distributed database system.

The determining module 1220 is configured to: determine latest-version metadata of the target data object according to the current global latest version information, and determine to-be-accessed user data of the target transaction according to the transaction timestamp.

The transaction processing module 1230 is configured to execute an operation statement of the target transaction on the to-be-accessed user data based on the latest-version metadata of the target data object.

The apparatus 1200 may further include a modification module. The modification module is configured to: receive a modification instruction for metadata of any data object, and generate modified metadata of the data object according to the modification instruction; commit the modified metadata to a global metadata storage; and update the global latest version information to version information of the modified metadata when the modified metadata is successfully committed.

The modification module may be further configured to: transmit a first timestamp allocation request to a global timestamp manager when the modified metadata is generated, and receive a timestamp returned by the global timestamp manager based on the first timestamp allocation request, and determine the timestamp as the version information of the modified metadata.

A local cache of the working node stores version information of latest local metadata of a data object. The modification module may be further configured to: write the modified metadata to the local cache when the modified metadata is successfully committed; and update version information of latest local metadata of a data object whose metadata is modified to the version information of the modified metadata in the local cache.

The determining module 1220 may determine the latest-version metadata of the target data object according to the current global latest version information in the following manner: obtaining version information of latest local metadata of the target data object from the local cache; comparing to determine whether the version information of the latest local metadata of the target data object is the same as the current global latest version information; and in a case of yes, obtaining the latest local metadata of the target data object as the latest-version metadata of the target data object from metadata stored in the local cache.

The determining module 1220 may determine the latest-version metadata of the target data object according to the current global latest version information in the following manner: when the version information of the latest local metadata of the target data object is different from the current global latest version information, searching metadata of various versions of the target data object stored in the local cache and the global metadata storage, to determine whether target metadata exists, where version information of the found target metadata is higher than the obtained latest local version information, and is not higher than the current global latest version information; and determining target metadata having latest version information of the found target metadata as the latest-version metadata of the target data object when the target metadata exists.

The determining module 1220 may be further configured to: after determining the target metadata having the latest version information of the found target metadata as the latest-version metadata of the target data object, update the target metadata having the latest version information to the local cache; and update the version information of the latest local metadata of the target data object to version information corresponding to the target metadata having the latest version information.

The determining module 1220 may further determine the latest-version metadata of the target data object according to the current global latest version information in the following manner: determining the latest local metadata of the target data object as the latest-version metadata of the target data object when the target metadata does not exist; and updating the version information of the latest local metadata of the target data object as the current global latest version information.

The global latest version information is stored in a global timestamp manager in the distributed database system. The obtaining module 1210 may obtain the transaction timestamp of the target transaction and the current global latest version information of the distributed database system in the following manner: transmitting a second timestamp allocation request corresponding to the target transaction to the global timestamp manager; and receiving response information returned by the global timestamp manager based on the second timestamp allocation request, where the response information includes the transaction timestamp of the target transaction and the current global latest version information.

The transaction processing module 1230 may execute the operation statement of the target transaction on the to-be-accessed user data based on the latest-version metadata of the target data object in the following manner: parsing the operation statement of the target transaction according to latest-version schema information of the target data object; and processing the to-be-accessed user data according to a parsing result.

A person skilled in the art may clearly understand that, for simple and clear description, for specific work processes of the foregoing described apparatus and module, reference may be made to corresponding process in the foregoing method embodiments, and details are not described herein again.

In several embodiments provided in this application, the displayed or discussed modules mutual couplings or direct couplings or communication connections may be implemented by using some interfaces. The indirect couplings or communication connections between the apparatuses or modules may be implemented in electronic, mechanical, or other forms.

In addition, functional modules in the embodiments of this application may be integrated into one processing module, or each of the modules may exist alone physically, or two or more modules are integrated into one module. The integrated module may be implemented in the form of hardware, or may be implemented in the form of a software functional module. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 13:
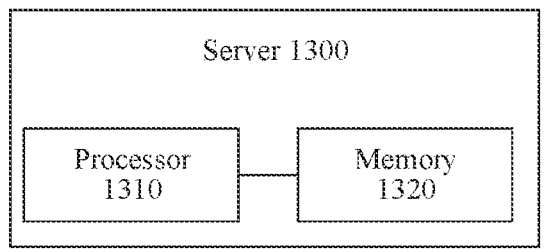
FIG. 13 is a block diagram of a server configured to perform a database transaction processing method of an embodiment of this application according to an embodiment of this application.

FIG. 13 is a structural block diagram of a server 1300 according to an embodiment of this application. The server 1300 may be a server of the foregoing working node, may be an independent server or a server cluster including multiple physical servers, or may be a cloud server configured to execute a basic cloud computing service such as cloud computing, big data, and an artificial intelligence platform. The server 1300 in this application may include one or more of the following components: a processor 1310, a memory 1320, and one or more application programs. The one or more application programs may be stored in the memory 1320 and configured to be executed by one or more processors 1310. The one or more programs are configured to perform the methods in the foregoing method embodiments.

The processor 1310 may include one or more processing cores. The processor 1310 connects all parts of the entire server 1300 through various interfaces and lines. By running or executing instructions, programs, code sets, or instruction sets stored in the memory 1320 and invoking data stored in the memory 1320, the processor performs various functions of the server 1300 and performs data processing. In some embodiments, the processor 1310 may be implemented by using at least one hardware form of a digital signal processor (DSP), a field-programmable gate array (FPGA), and a programmable logic array (PLA). The processor 1310 may be integrated with one or a combination of a central processing unit (CPU), a graphics processing unit (GPU), a modem, and the like. The CPU mainly processes an operating system, a user interface, an application program, and the like. The GPU is responsible for rendering and drawing displayed content. The modem is configured to process wireless communication. It can be understood that, the modem may not be integrated into the processor 1310, and is implemented through a communication chip alone.

The memory 1320 may include a random access memory (Random Access Memory, RAM), or may include a read only memory (Read Only Memory. ROM). The memory 1320 may be configured to store instructions, programs, code, code sets, or instruction sets. The memory 1320 may mainly include a program storage area and a data storage area. The program storage area may store instructions for implementing an operating system, instructions for implementing at least one function (for example, a touch function, a sound playback function, and an image playback function), instructions for implementing the foregoing method embodiments, and the like. The data storage area may further store data (for example, metadata) created during usage of the server 1300, and the like.

Figure 14:
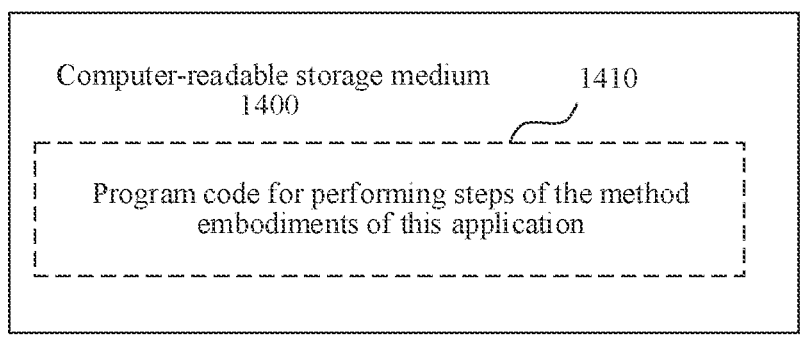
FIG. 14 shows a storage unit configured to store or carry program code for performing a database transaction processing method of an embodiment of this application according to an embodiment of this application.

FIG. 14 is a structural block diagram of a non-transitory computer-readable storage medium according to an embodiment of this application. The computer-readable storage medium stores program code, and the program code is capable of being invoked by a processor, to perform the methods in the foregoing method embodiments.

The computer-readable storage medium 1400 may be an electronic memory such as a flash memory, an electrically erasable programmable read-only memory (EEPROM), an EPROM, a hard disk, or a ROM. In some embodiments, the computer-readable storage medium 1400 includes a non-transitory computer-readable storage medium (NTCRSM). The computer-readable storage medium 1400 has a storage space of program code 1410 for performing any method step in the foregoing method. The computer-readable storage medium 1400 has a storage space of program code 1410 for performing any method step in the foregoing method. The program code 1410 may be, for example, compressed in an appropriate form.

Finally, the foregoing embodiments are merely used for describing the technical solutions of this application, but are not intended to limit this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application.

What is claimed is:

1. A database transaction processing method performed by a working node in a distributed database system, the method comprising:
   in a case of starting a target transaction on user data stored in the distributed database system, obtaining a transaction timestamp of the target transaction and current global latest version information of the distributed database system, the target transaction comprising at least one operation statement for a target data object of the user data stored in the database system, and the current global latest version information being version information of latest generated metadata stored in the distributed database system for describing logical structures and features of the user data stored in the database system;
   determining latest-version metadata of the target data object according to the current global latest version information;
   determining, among the user data stored in the distributed data system, to-be-accessed user data of the target data object according to the transaction timestamp, wherein the to-be-accessed user data of the target data object is user data associated with the target transaction whose version information is lower than or equal to version information of a user data snapshot obtained at the transaction timestamp; and
   executing an operation statement of the target transaction on the to-be-accessed user data of the target data object based on the latest-version metadata of the target data object.

2. The method according to claim 1, wherein the method further comprises:
   receiving a modification instruction for metadata of a data object, and generating modified metadata of the data object according to the modification instruction;
   committing the modified metadata to a global metadata storage; and
   updating the global latest version information to version information of the modified metadata when the modified metadata is successfully committed.

3. The method according to claim 2, wherein before the committing the modified metadata to a global metadata storage, the method further comprises:
   transmitting a first timestamp allocation request to a global timestamp manager when the modified metadata is generated; and
   receiving a timestamp returned by the global timestamp manager based on the first timestamp allocation request, and determining the timestamp as the version information of the modified metadata.

4. The method according to claim 2, wherein the global latest version information is stored in a global timestamp manager, and the updating the global latest version information to version information of the modified metadata comprises:
   transmitting a commit success notification to the global timestamp manager, so that the global timestamp manager updates the stored global latest version information to the version information of the modified metadata according to the commit success notification.

5. The method according to claim 2, wherein a local cache of the working node stores version information of latest local metadata of a data object, and the method further comprises:
   writing the modified metadata to the local cache when the modified metadata is successfully committed; and
   updating version information of latest local metadata of a data object whose metadata is modified to the version information of the modified metadata in the local cache.

6. The method according to claim 1, wherein the determining latest-version metadata of the target data object according to the current global latest version information comprises:
   determining to-be-accessed metadata in the global metadata storage of the distributed database system according to the current global latest version information, and searching for the latest-version metadata of the target data object from the determined to-be-accessed metadata, wherein the to-be-accessed metadata is metadata whose version information is lower than or equal to the current global latest version information in the global metadata storage.

7. The method according to claim 1, wherein the determining latest-version metadata of the target data object according to the current global latest version information comprises:
   obtaining version information of latest local metadata of the target data object from the local cache;
   comparing to determine whether the version information of the latest local metadata of the target data object is the same as the current global latest version information; and
   in a case of yes, obtaining the latest local metadata of the target data object as the latest-version metadata of the target data object from metadata stored in the local cache.

8. The method according to claim 7, wherein the determining latest-version metadata of the target data object according to the current global latest version information further comprises:
   when the version information of the latest local metadata of the target data object is different from the current global latest version information, searching metadata of various versions of the target data object stored in the local cache and the global metadata storage, to determine whether target metadata exists, wherein version information of the found target metadata is higher than the version information of the latest local metadata of the target data object, and is not higher than the current global latest version information; and determining target metadata having latest version information of the found target metadata as the latest-version metadata of the target data object when the target metadata exists.

9. The method according to claim 8, wherein after the determining target metadata having latest version information of the found target metadata as the latest-version metadata of the target data object, the method further comprises:

updating the target metadata having the latest version information to the local cache; and updating the version information of the latest local metadata of the target data object to version information corresponding to the target metadata having the latest version information.

10. The method according to claim 8, wherein the determining latest-version metadata of the target data object according to the current global latest version information further comprises:

determining the latest local metadata of the target data object as the latest-version metadata of the target data object when the target metadata does not exist.

11. The method according to claim 10, wherein the method further comprises:

updating the version information of the latest local metadata of the target data object as the current global latest version information when the target metadata does not exist.

12. The method according to claim 1, wherein the global latest version information is stored in a global timestamp manager in the distributed database system, and the obtaining a transaction timestamp of the target transaction and current global latest version information of the distributed database system comprises:

transmitting a second timestamp allocation request corresponding to the target transaction to the global timestamp manager; and receiving response information returned by the global timestamp manager based on the second timestamp allocation request, wherein the response information comprises the transaction timestamp of the target transaction and the current global latest version information.

13. The method according to claim 1, wherein the executing an operation statement of the target transaction on the to-be-accessed user data of the target data object based on the latest-version metadata of the target data object comprises:

parsing the operation statement of the target transaction according to latest-version schema information of the target data object; and processing the to-be-accessed user data of the target data object according to a parsing result.

14. A computer device acting as a working node in a distributed database system, comprising:
one or more processors;
a memory; and
one or more programs, the one or more programs being stored in the memory and, when executed by the one or more processors, causing the computer device to perform a database transaction processing method including:

in a case of starting a target transaction on user data stored in the distributed database system, obtaining a transaction timestamp of the target transaction and current global latest version information of the distributed database system, the target transaction comprising at least one operation statement for a target data object of the user data stored in the database system, and the current global latest version information being version information of latest generated metadata stored in the distributed database system for describing logical structures and features of the user data stored in the database system;

determining latest-version metadata of the target data object according to the current global latest version information;

determining, among the user data stored in the distributed data system, to-be-accessed user data of the target data object according to the transaction times tamp, wherein the to-be-accessed user data of the target data object is user data associated with the target transaction whose version information is lower than or equal to version information of a user data snapshot obtained at the transaction timestamp; and executing an operation statement of the target transaction on the to-be-accessed user data of the target data object based on the latest-version metadata of the target data object.

15. The computer device according to claim 14, wherein the method further comprises:

receiving a modification instruction for metadata of a data object, and generating modified metadata of the data object according to the modification instruction;

committing the modified metadata to a global metadata storage; and updating the global latest version information to version information of the modified metadata when the modified metadata is successfully committed.

16. The computer device according to claim 14, wherein the determining latest-version metadata of the target data object according to the current global latest version information comprises:

determining to-be-accessed metadata in the global metadata storage of the distributed database system according to the current global latest version information, and searching for the latest-version metadata of the target data object from the determined to-be-accessed metadata, wherein the to-be-accessed metadata is metadata whose version information is lower than or equal to the current global latest version information in the global metadata storage.

17. The computer device according to claim 14, wherein the determining latest-version metadata of the target data object according to the current global latest version information comprises:

obtaining version information of latest local metadata of the target data object from the local cache;

comparing to determine whether the version information of the latest local metadata of the target data object is the same as the current global latest version information; and in a case of yes, obtaining the latest local metadata of the target data object as the latest-version metadata of the target data object from metadata stored in the local cache.

18. The computer device according to claim 14, wherein the global latest version information is stored in a global timestamp manager in the distributed database system, and the obtaining a transaction timestamp of the target transaction and current global latest version information of the distributed database system comprises:

transmitting a second timestamp allocation request corresponding to the target transaction to the global timestamp manager; and receiving response information returned by the global timestamp manager based on the second timestamp allocation request, wherein the response information comprises the transaction timestamp of the target transaction and the current global latest version information.

19. The computer device according to claim 14, wherein the executing an operation statement of the target transaction on the to-be-accessed user data of the target data object based on the latest-version metadata of the target data object comprises:

parsing the operation statement of the target transaction according to latest-version schema information of the target data object; and processing the to-be-accessed user data of the target data object according to a parsing result.

20. A non-transitory computer-readable storage medium, storing one or more programs, the one or more programs, when executed by a processor of a computer device acting as a working node in a distributed database system, causing the computer device to perform a database transaction processing method including:

in a case of starting a target transaction on user data stored in the distributed database system, obtaining a transaction timestamp of the target transaction and current global latest version information of the distributed database system, the target transaction comprising at least one operation statement for a target data object of the user data stored in the database system, and the current global latest version information being version information of latest generated metadata stored in the distributed database system for describing logical structures and features of the user data stored in the database system;

determining latest-version metadata of the target data object according to the current global latest version information;

determining, among the user data stored in the distributed data system, to-be-accessed user data of the target data object according to the transaction timestamp, wherein the to-be-accessed user data of the target data object is user data associated with the target transaction whose version information is lower than or equal to version information of a user data snapshot obtained at the transaction timestamp; and executing an operation statement of the target transaction on the to-be-accessed user data of the target data object based on the latest-version metadata of the target data object.

\* \* \* \* \*